US010302044B2

(12) United States Patent
Schrell

(10) Patent No.: US 10,302,044 B2
(45) Date of Patent: May 28, 2019

(54) TRANSLATING CASCADE THRUST REVERSER WITH CONTROL OF BLOCKER DOOR

(71) Applicant: Rohr, Inc., Chula Vista, CA (US)

(72) Inventor: Johann S. Schrell, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 472 days.

(21) Appl. No.: 14/974,141

(22) Filed: Dec. 18, 2015

(65) Prior Publication Data

US 2017/0175674 A1 Jun. 22, 2017

(51) Int. Cl.
*F02K 1/62* (2006.01)
*F02K 1/76* (2006.01)
*F02K 1/70* (2006.01)
*F02K 1/72* (2006.01)
*F02K 3/06* (2006.01)

(52) U.S. Cl.
CPC .................. *F02K 1/62* (2013.01); *F02K 1/70* (2013.01); *F02K 1/72* (2013.01); *F02K 1/763* (2013.01); *F02K 3/06* (2013.01); *F05D 2220/323* (2013.01); *F05D 2260/606* (2013.01)

(58) Field of Classification Search
CPC ..... F02K 1/64; F02K 1/70; F02K 1/72; F02K 1/62; F02K 1/625; F02K 1/766; F02K 1/763
See application file for complete search history.

(56) References Cited

U.S. PATENT DOCUMENTS

| 3,503,211 | A | 3/1970 | Medawar |
| 3,511,055 | A * | 5/1970 | Timms ...................... F02K 1/72 239/265.29 |
| 4,340,178 | A * | 7/1982 | Lawson .................. F02K 1/605 239/265.31 |
| 5,197,693 | A | 3/1993 | Remlaoui |
| 5,228,641 | A | 7/1993 | Remlaoui |
| 6,895,742 | B2 | 5/2005 | Lair et al. |
| 7,874,142 | B2 | 1/2011 | Beardsley |
| 8,109,467 | B2 | 2/2012 | Murphy |
| 8,316,632 | B2 | 11/2012 | West et al. |
| 8,720,818 | B1 | 5/2014 | Teulou et al. |
| 8,904,751 | B2 | 12/2014 | Howarth et al. |
| 9,068,532 | B2 | 6/2015 | Gormley |
| 2010/0058769 | A1 * | 3/2010 | Baran ...................... F02K 1/06 60/771 |
| 2012/0187214 | A1 | 7/2012 | Welch et al. |
| 2013/0284822 | A1 | 10/2013 | Howarth et al. |

(Continued)

OTHER PUBLICATIONS

EP search report for EP16204723.7 dated Apr. 24, 2017.

*Primary Examiner* — Craig Kim
*Assistant Examiner* — Katheryn A Malatek
(74) *Attorney, Agent, or Firm* — O'Shea Getz P.C.

(57) ABSTRACT

Aspects of the disclosure are directed to a system associated with a thrust reverser of an aircraft, comprising: a set of cascades incorporating a track, the track including a first track end and a second track end, a blocker door, and a link including a first link end coupled to the track and a second link end coupled to the blocker door, where the cascades are configured to translate between a stowed position and a deployed position to cause the first link end to traverse the track.

13 Claims, 9 Drawing Sheets

(56) References Cited

U.S. PATENT DOCUMENTS

| | | | |
|---|---|---|---|
| 2014/0131479 A1* | 5/2014 | Kerbler | F02K 1/72 |
| | | | 239/265.19 |
| 2015/0107221 A1 | 4/2015 | Aten et al. | |
| 2015/0308380 A1 | 10/2015 | Biset | |
| 2016/0083103 A1* | 3/2016 | Munier | B64D 31/04 |
| | | | 239/265.19 |

* cited by examiner

TRANSLATING CASCADE THRUST REVERSER WITH CONTROL OF BLOCKER DOOR

BACKGROUND

Referring to FIG. 1A, a nacelle 100 of an aircraft may be used to house an engine. The nacelle 100 may be composed of multiple components, such as for example a thrust reverser 102. The thrust reverser 102 includes components that are used to generate reverse thrust during aircraft descent/landing.

FIG. 1B illustrates a portion of a conventional nacelle 100/thrust reverser 102 used to generate reverse thrust. A bypass duct 154 is at least partially defined between a (radially outer portion of an) inner fixed structure (IFS) 158 and a (radially inner portion of a) cowl/sleeve 162.

After aircraft landing the thrust reverser 102 is in a deployed state. In the deployed state, blocker doors (one of which is shown in FIG. 1B as reference character 166) assume a deployed position as shown in FIG. 1B, where the blocker doors 166 redirect substantially all of a bypass airflow flowing through the bypass duct 154 radially outboard through one or more sets of cascades 170. When the thrust reverser 102 is in the deployed state, the sleeve 162 is translated aft to expose the cascades 170 to the external environment and to avoid having the bypass flow impinge on a radially inner surface of the sleeve 162. For completeness, a link 174 is shown that couples a blocker door 166 to the IFS 158.

When the aircraft is in flight/cruise the thrust reverser 102 is in a stowed state. Relative to what is shown in FIG. 1B, when the thrust reverser 102 is in the stowed state the sleeve 162 is translated forward and the blocker doors 166 assume a stowed position denoted by reference character 178. In the stowed state, the cascades 170 are concealed from the bypass duct 154 at least in part by the blocker doors 166 and the cascades are concealed from the external environment by the sleeve 162.

When the blocker doors 166 are in the stowed position 178, a radially inner surface 166a of a blocker door 166 interfaces with the bypass duct 154. This means that there are numerous steps and gaps that contribute to losses/inefficiencies during aircraft flight/cruise. These steps/gaps also reduce the area that can be acoustically treated for noise reduction. Furthermore, the cascades 170 are typically fixed (e.g., do not translate), dictating to an extent the length of the sleeve 162 that must be used.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a system associated with a thrust reverser of an aircraft, comprising: a set of cascades incorporating a track, the track including a first track end and a second track end, a blocker door, and a link including a first link end coupled to the track and a second link end coupled to the blocker door, where the cascades are configured to translate between a stowed position and a deployed position to cause the first link end to traverse the track. In some embodiments, the system further comprises a sleeve. In some embodiments, the sleeve and the cascades are configured to translate via a common actuator or actuation mechanism. In some embodiments, the blocker door is configured to be contained within a cavity of the sleeve when the thrust reverser is stowed. In some embodiments, the first link end is configured to be located within the first track end when the thrust reverser is stowed. In some embodiments, the first link end is configured to be located within the second track end when the thrust reverser is at least partially deployed in an amount greater than a threshold. In some embodiments, the blocker door is configured to be in a stowed position relative to a bypass duct when the first link end is not located within the second track end. In some embodiments, the blocker door is configured to be in an at least partially deployed position relative to a bypass duct when the first link end is located within the second track end. In some embodiments, at least one of the first track end or the second track end includes a trapping device. In some embodiments, the first track end includes a first trapping device and the second track end includes a second trapping device. In some embodiments, the trapping device includes a leaf spring. In some embodiments, the first link end is substantially shaped as a ball, and the first track end and the second track end are substantially shaped as dimples configured to seat the first link end. In some embodiments, the system further comprises a hinge coupled to the blocker door, where the hinge is attached to a fixed structure and the hinge is configured to enable the blocker door to rotate.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1A:
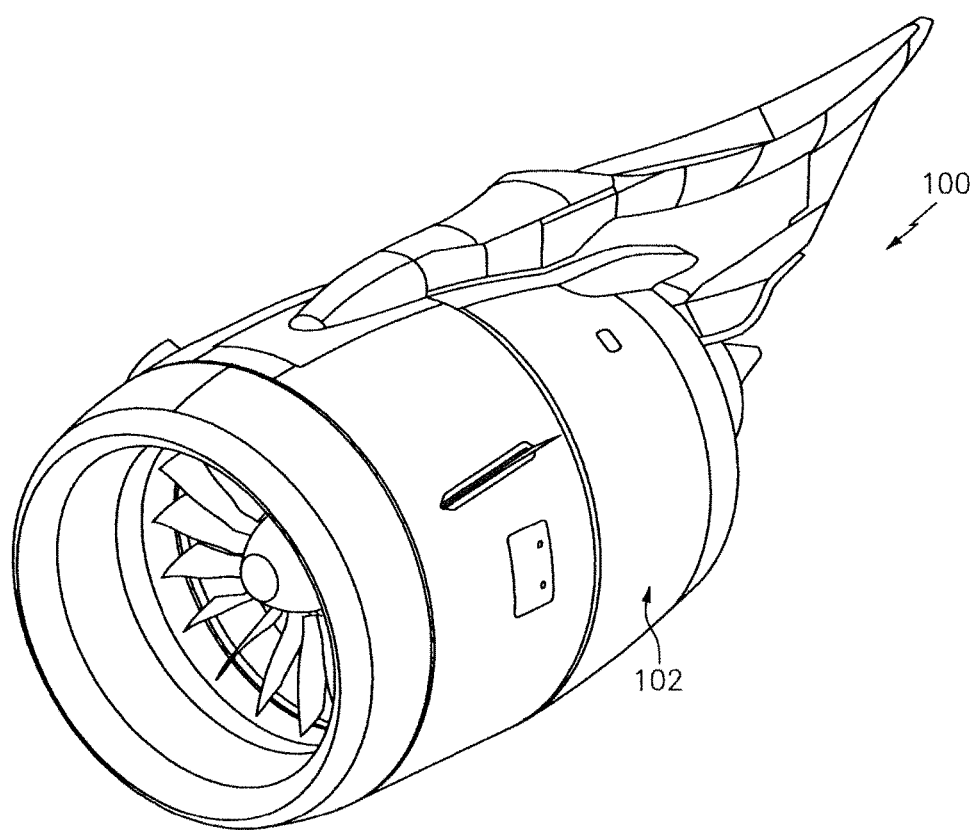
FIG. 1A illustrates an aircraft nacelle in accordance with the prior art.

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

In accordance with various aspects of the disclosure, apparatuses, systems and methods are described in connection with an arrangement of a thrust reverser. In some embodiments, a set of cascades/cascade vanes may be configured to move/translate based on a deployment or stowing of the thrust reverser. In some embodiments, a translation of the cascades may be tied to a translation of a sleeve. In some embodiments, a link of a blocker door is configured to move within a track. The track may be located in the cascades. The track may include, or be associated with, one or more features that may hold/retain the link in a given position/state. As described further below, the configuration of the track and link may be used to delay a deployment of the blocker door relative to a translating sleeve.

Referring now to FIGS. 2A-2E, components of a system 202 associated with a thrust reverser are shown. Taking FIGS. 2A-2E in order/sequence, the figures reflect a progression in terms of a deployment of the thrust reverser when, e.g., an aircraft is landing. For example, FIG. 2A may represent the thrust reverser in stowed state, whereas FIG. 2E may represent the thrust reverser in a fully deployed state.

Figure 1B:
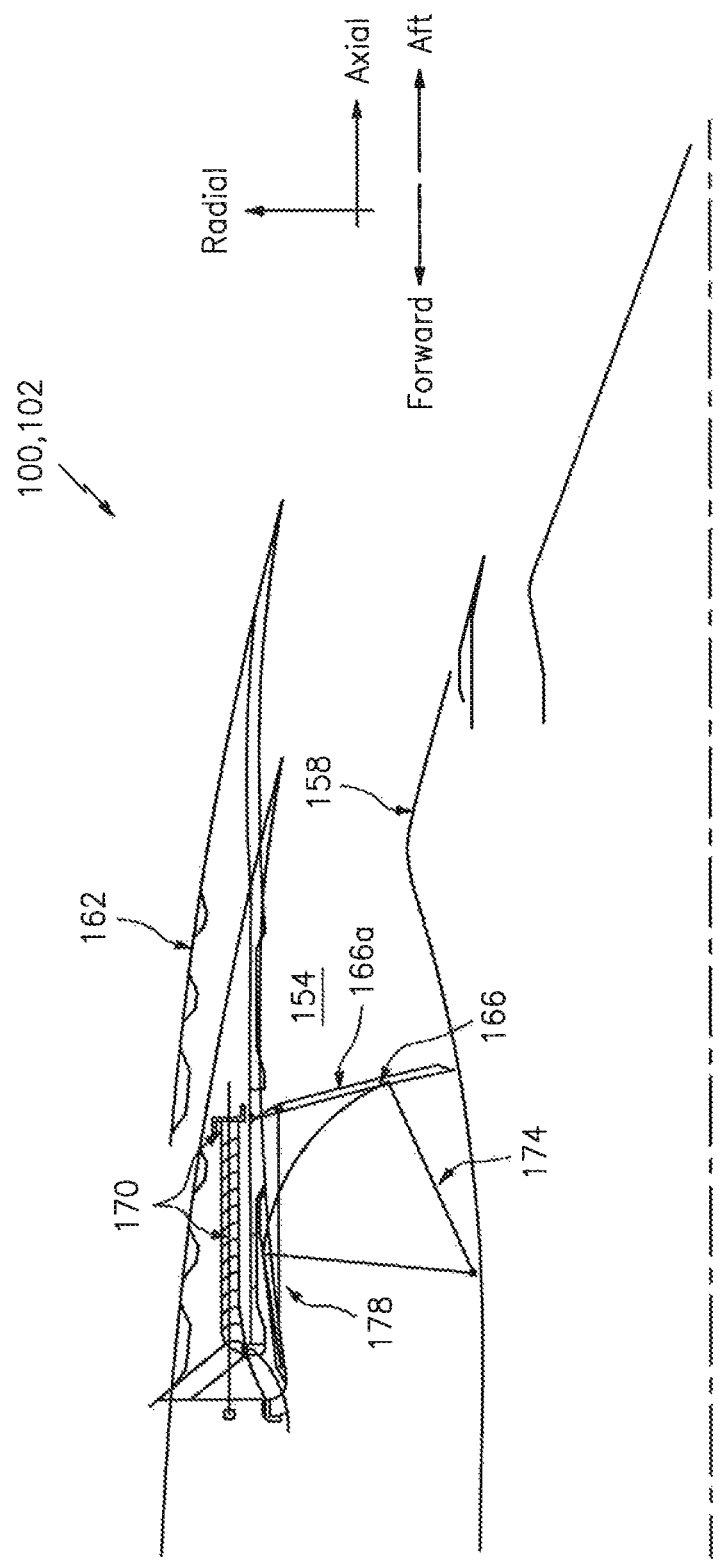
FIG. 1B illustrates a portion of the aircraft nacelle of FIG. 1A used in selectively generating reverser thrust in accordance with the prior art.
Figure 2A:
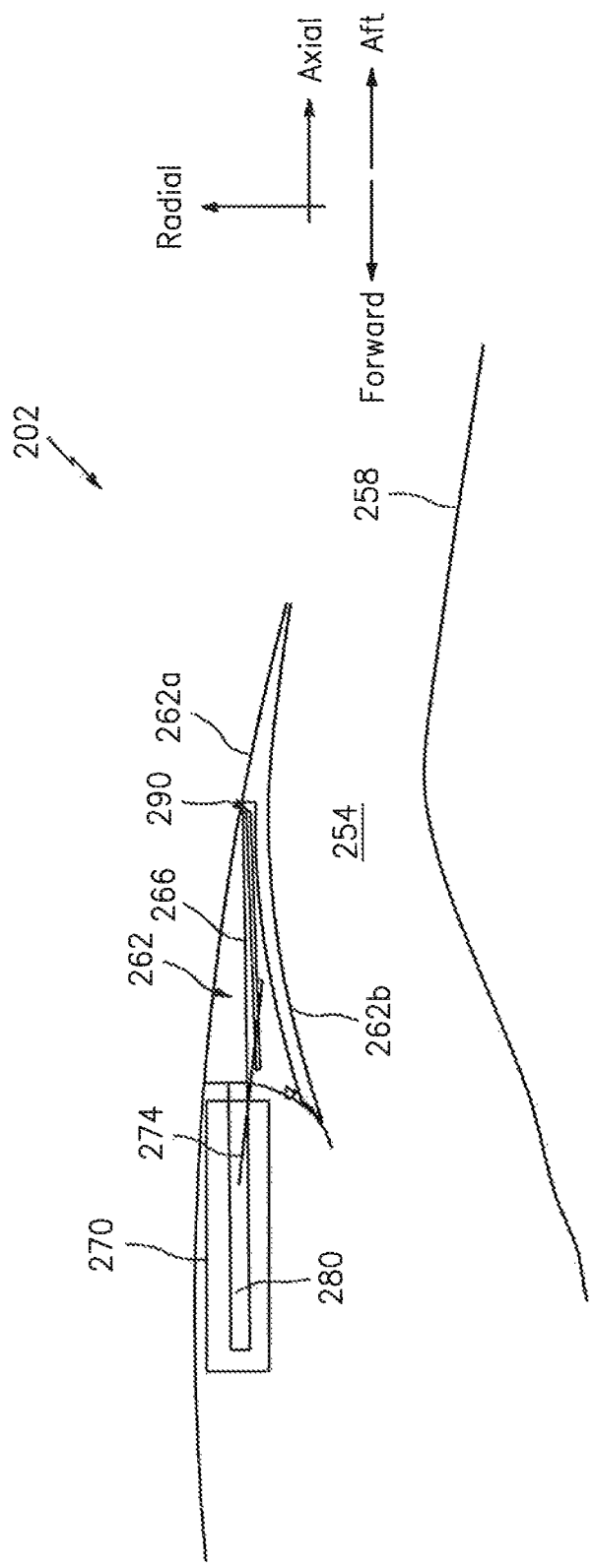
FIG. 2A-2E illustrate a system incorporating a thrust reverser in accordance with aspects of this disclosure.

Referring to FIG. 2A an arrangement of a bypass duct 254 that is at least partially located/defined between an IFS 258 and a translating sleeve 262 is shown. In contrast to the arrangement described above in connection with FIG. 1B (wherein the surface 166a of the blocker door 166 interfaces to the bypass duct 154 when the thrust reverser is stowed and the blocker door 166 is in the position 178), when the thrust reverser is stowed as shown in FIG. 2A a blocker door 266 is contained within a cavity at least partially formed by radial outer and inner panels 262a and 262b of the sleeve 262.

The containment of the blocker door 266 within (the cavity of) the sleeve 262 when the thrust reverser is stowed may allow for additional design opportunities in terms of the blocker door 266, as the blocker door 266 does not interface directly to the bypass duct 254 when the thrust reverser is stowed. For example, as the door 266 might not need to follow loft shape, the blocker door 266 can be configured/shaped to optimize reverse performance. Additionally, by concealing the blocker door 266 within the sleeve 262, an increase in acoustic area may be obtained, such that acoustic performance may be improved/increased.

A link 274 may couple the blocker door 266 and cascades 270, such that the link 274 may support the door 266. A track 280 may be located in the cascades 270. The track 280 may receive a first end of the link 274. A second end of the link 274 may be coupled to the door 266. The door 266 may also be supported by a hinge 290 attached to a fixed structure (e.g., a fixed support ring). The hinge 290 may allow the door 266 to pivot/rotate during deployment.

As described above, FIGS. 2B-2D represent a progression in terms of the deployment of the thrust reverser. For example, the sleeve 262 and the cascades 270/track 280 have been translated aft in FIG. 2B relative to FIG. 2A. Similarly, in FIG. 2C the sleeve 262 and the cascades 270/track 280 have been translated even further aft relative to FIG. 2B. In some embodiments, the translation of the sleeve 262 and the cascades 270/track 280 may be facilitated via the use of a common actuator or actuation scheme.

Figure 2B:
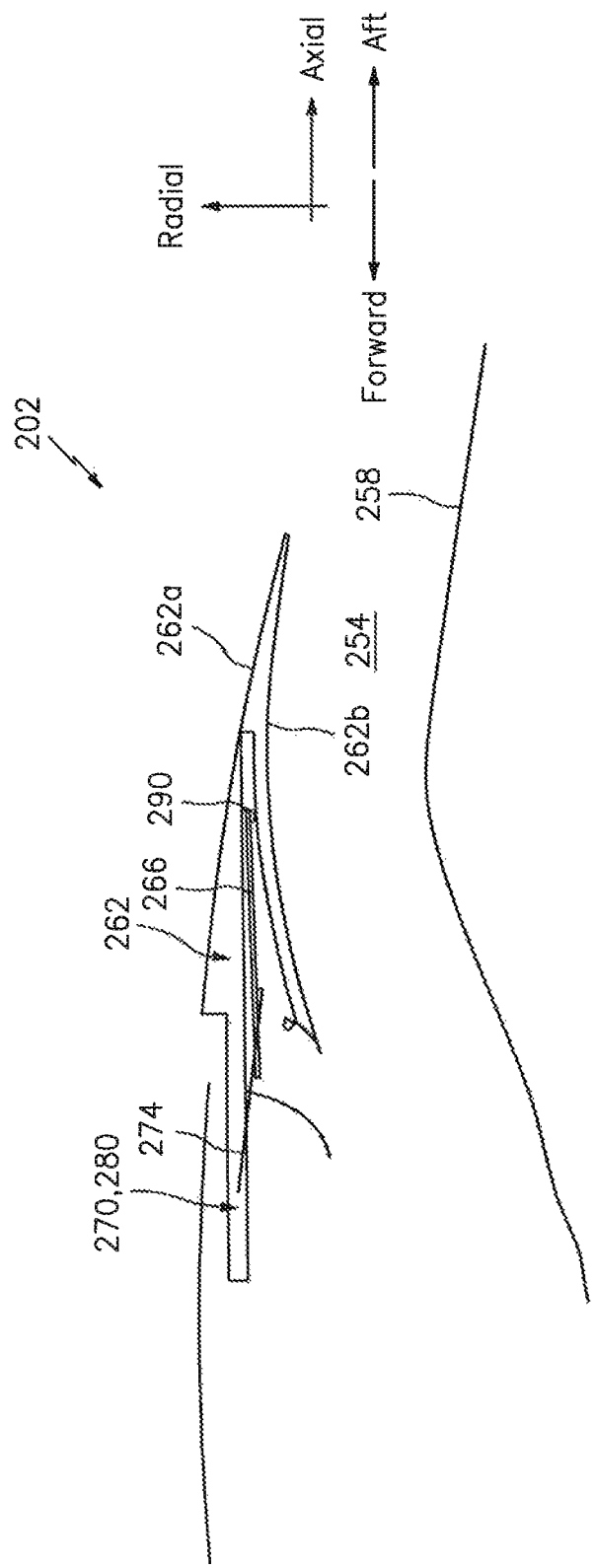
Figure 2C:
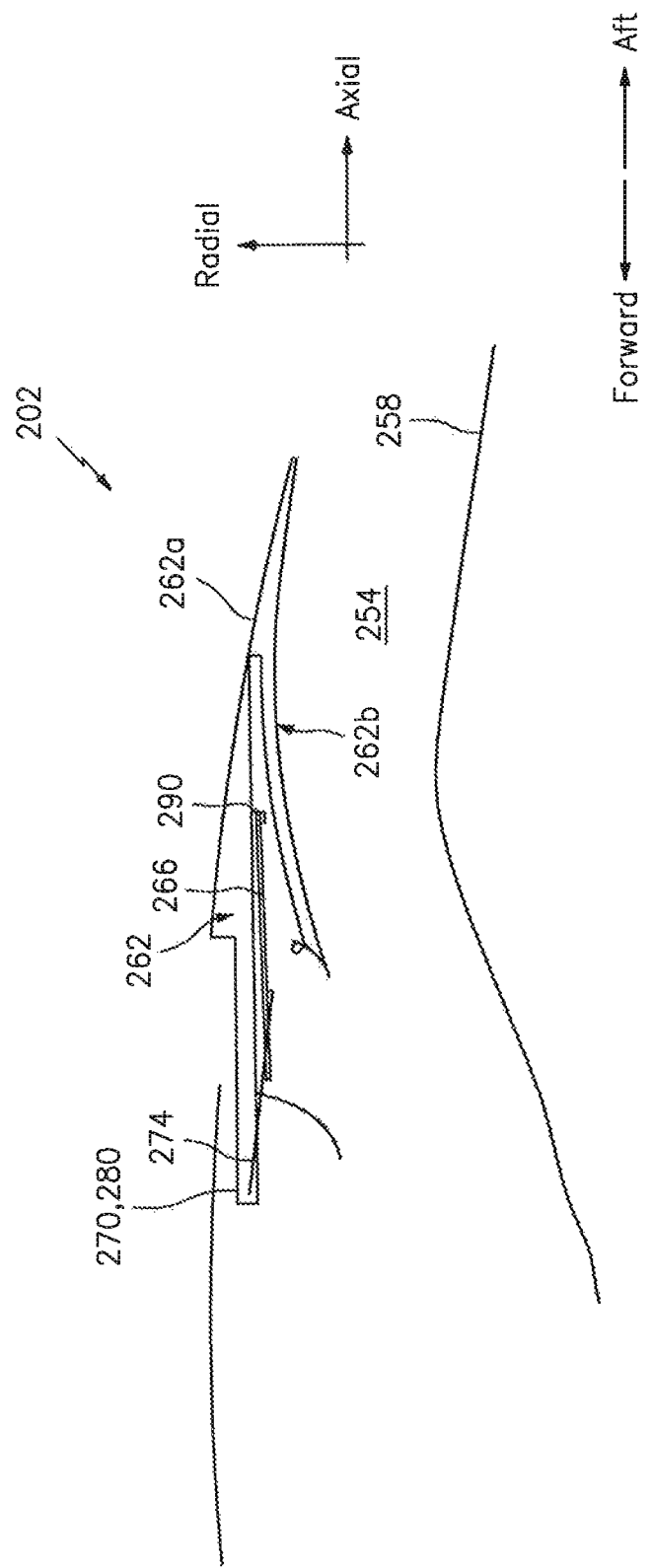

As shown in the progression from FIG. 2A to 2C, the translation of the cascades 270 in the aft direction has a tendency to cause the link 274 to approach the forward end of the track 280. While the link 274 is effectively traversing the track 280 in progressing from FIG. 2A to FIG. 2C, the blocker door 266 might not be rotated about the hinge 290. In other words, the blocker door 266 may remain stowed during the initial stages of the deployment of the thrust reverser. Retaining the blocker door 266 in the stowed state/position during such initial stages may help to ensure that sleeve 262 is translated far enough aft to avoid clashing with a deployed blocker door 266.

Figure 2D:
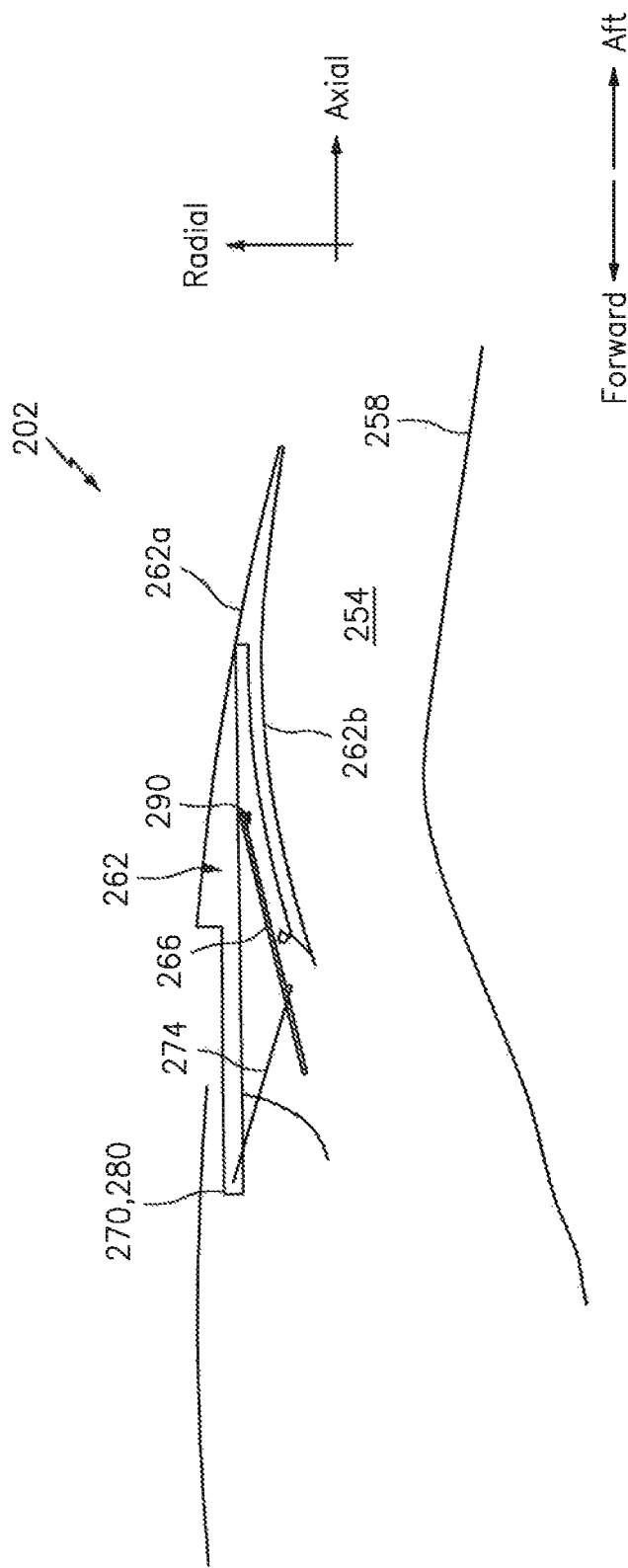
Figure 2E:
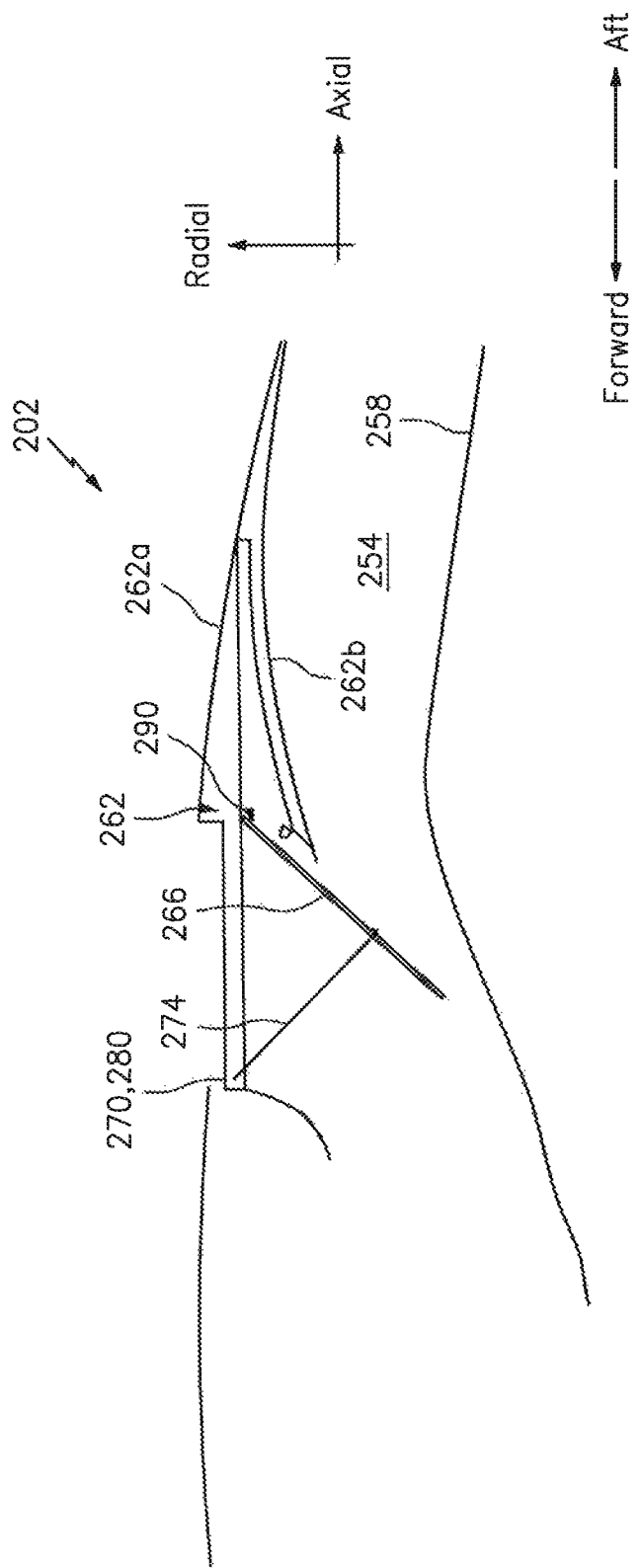

Relative to FIG. 2C (wherein an end of the link 274 that resides within the track 280 is located at, or proximate to, the forward end of the track 280), as the thrust reverser continues to be deployed (e.g., when the deployment of the thrust reverser exceeds a threshold) the blocker door 266 may begin to deploy by rotating about the hinge 290 as seen in FIG. 2D. For example, when the link 274 is located at the forward end of the track 280 the link 274 may push on the blocker door 266 to cause the blocker door 266 to rotate down into the bypass duct 254. Relative to FIG. 2D, in FIG. 2E the blocker door 266 is further rotated down into the bypass duct 254 and the scenario depicted in FIG. 2E may be indicative of the thrust reverser having been fully deployed.

FIGS. 2A-2D illustrate a track 280 located in cascades 270, a blocker door 266 and a link 274. As illustrated by the sequence of FIGS. 2A-2C, the link 274 may traverse the track 280; e.g., move from right to left along the track 280. Notably, the blocker door 266 does not rotate during the link's 274 traversing of the track 280. Rather, the blocker door 266 begins to rotate only after the link 274 has reached an end (e.g., left end) of the track 280 and, thus, no longer traverses the track 280 as illustrated by the sequence of FIGS. 2C to 2D. Note, the link 274 does not traverse within the track 280 between the positions of FIGS. 2C and 2D.

Figure 3A:
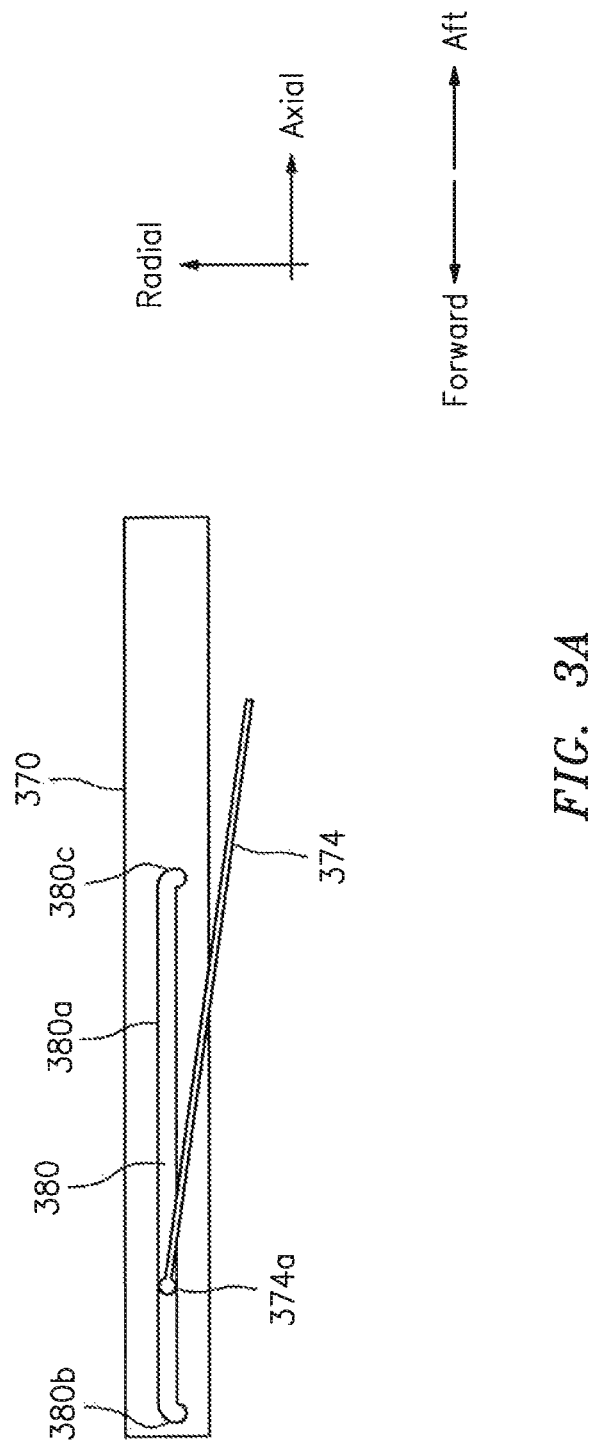
FIG. 3A illustrates a track configuration used for supporting a link of a blocker door in accordance with aspects of this disclosure.

Referring to FIG. 3A, cascades 370 (which may correspond to the cascades 270) incorporating a track 380 (which may correspond to the track 280) in accordance with one or more embodiments is shown. A link 374 (which may correspond to the link 274) may be configured to traverse the track 380. For example, the link 374 may include a feature 374a at an end of the link 374 that may be configured to slide or roll within the track 374. The feature 374a may be round or ball-shaped as shown.

The track 380 may be configured with one or more portions. For example, a relatively long, straight portion 380a may reside between two ends 380b and 380c. The ends 380b and 380c may have round/dimple/ball-like shapes and may be similar in shape to the end/feature 374a in order to receive/seat the end/feature 374a.

The ends 380b and 380c may be configured to contain the end/feature 374a. For example, the end/feature 374a may be located within the end 380c when a thrust reverser is in a first state (e.g., a stowed state). The end/feature 374a may be located within the end 380b when the thrust reverser is in a second state (e.g., at least a partially deployed state). The presence of the end/feature 374a within the end 380b may enable a blocker door associated with the link 374 to rotate (e.g., analogous to the transition from FIG. 2C to FIG. 2D described above).

In some embodiments, one or more portions of the track 380 (e.g., the ends 380b and 380c) may include a trapping device to retain the end 374a of the link 374. For example, a first trapping device located within the end 380c may ensure that the end 374a of the link is firmly/securely retained within the end 380c when the thrust reverser is stowed. Similarly, a second trapping device located within the end 380b may ensure that the end 374a of the link is firmly/securely retained within the end 380b to facilitate, e.g., deployment of a blocker door.

Figure 3B:
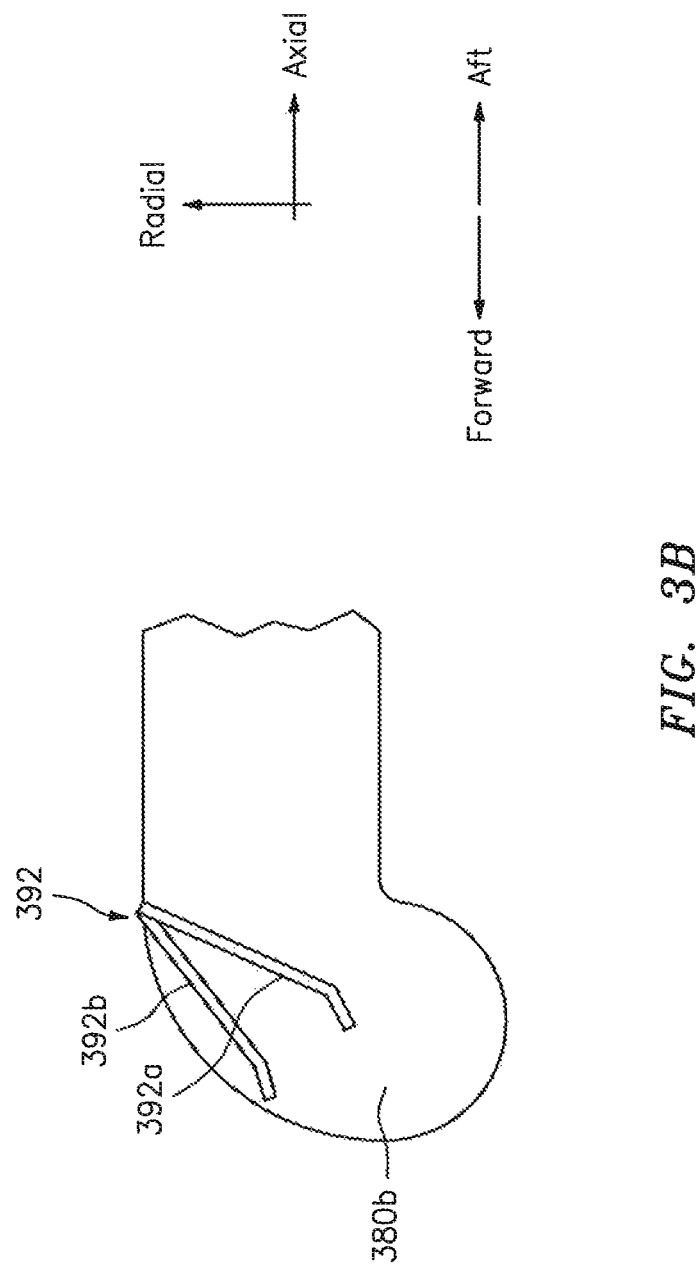
FIG. 3B illustrates a spring incorporated in a portion of the track of FIG. 3A for retaining the link of the blocker door in accordance with aspects of this disclosure.

FIG. 3B illustrates an example of a trapping device 392 incorporated in an end (illustratively, the end 380b) of the track 380. In some embodiments, the trapping device 392 may correspond to a spring (e.g., a leaf spring). The spring 392 may assume a number of positions/states. For example, a first, uncompressed state denoted by reference character 392*a* may correspond to the absence of the end 374*a* of the link 374 within the end 380*b* such as the condition/scenario depicted in FIG. 3A. Conversely, when the end 374*a* of the link 374 is located within the end 380*b* the spring 392 may be in a second, compressed state as denoted by reference character 392*b*.

One or more parameters of the embodiments described herein may be adjusted to accommodate a particular application environment. For example, a dimension (e.g., a length) of one or more tracks or links may be selected to provide for a predetermined delay between: (1) a translation of a sleeve, a cascade, or a track, and (2) a deployment of a blocker door. In some embodiments, a shape or dimension of one or more tracks (e.g., ends of tracks) or links (e.g., ends of links) may be selected to ensure that a blocker door is securely stowed or deployed based on a current flight operation (e.g., cruise, descent, landing, etc.). The inclusion of one or more trapping devices may provide for an additional layer/level of security. In some embodiments, one or more parameters may be adjusted to optimize/minimize leakage or provide for a given transit area match (e.g., a measure of airflow through a bypass duct during, e.g., cruise relative to outflows through one or more cascades during reverse thrust operation).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure. One or more features described in connection with a first embodiment may be combined with one or more features of one or more additional embodiments.

What is claimed is:

1. A system associated with a thrust reverser of an aircraft, comprising:
   a set of cascades;
   a track located in the set of cascades, the track including a first track end and a second track end;
   a blocker door; and
   a link including a first link end coupled to the track and a second link end coupled to the blocker door,
   wherein the set of cascades are configured to translate between a stowed position and a deployed position to cause the first link end to traverse the track, and the blocker door does not rotate while the link traverses the track.

2. The system of claim 1, further comprising:
   a sleeve.

3. The system of claim 2, wherein the sleeve and the set of cascades are configured to translate via a common actuator or an actuation mechanism.

4. The system of claim 2, wherein the blocker door is configured to be contained within a cavity of the sleeve when the thrust reverser is stowed.

5. The system of claim 1, wherein the first link end is configured to be located within the first track end when the thrust reverser is stowed.

6. The system of claim 5, wherein the first link end is configured to be located within the second track end when the thrust reverser is at least partially deployed in an amount greater than a threshold.

7. The system of claim 6, wherein the blocker door is configured to be in a stowed position relative to a bypass duct when the first link end is not located within the second track end.

8. The system of claim 6, wherein the blocker door is configured to be in an at least partially deployed position relative to a bypass duct when the first link end is located within the second track end.

9. The system of claim 1, wherein at least one of the first track end or the second track end includes a trapping device.

10. The system of claim 9, wherein the first track end includes a first trapping device and the second track end includes a second trapping device.

11. The system of claim 9, wherein the trapping device includes a leaf spring.

12. The system of claim 1, wherein the first link end is substantially shaped as a ball, and wherein the first track end and the second track end are substantially shaped as dimples configured to seat the first link end.

13. The system of claim 1, further comprising:
   a hinge coupled to the blocker door,
   wherein the hinge is attached to a fixed structure and the hinge is configured to enable the blocker door to rotate.

* * * * *